United States Patent

Gavrilidis et al.

Patent Number: 5,115,556
Date of Patent: May 26, 1992

[54] METHOD OF MANUFACTURING WINDINGS FOR ELECTROMAGNETIC MACHINES

[76] Inventors: George Gavrilidis; Edan Garcia, both of 271 Hanlon Road, Woodbridge, Ontario, Canada, L4L 3R7

[21] Appl. No.: 670,871
[22] Filed: Mar. 18, 1981
[51] Int. Cl.$^5$ ............................................. H02K 15/04
[52] U.S. Cl. ........................................ 29/596; 21/598; 264/272.2; 310/43
[58] Field of Search ................. 29/596, 598, 605, 606; 264/272.19, 272.2; 310/43, 44, 208

[56] References Cited

FOREIGN PATENT DOCUMENTS

| | | |
|---|---|---|
| 638999 | 3/1962 | Canada . |
| 752551 | 2/1967 | Canada . |
| 810373 | 4/1969 | Canada . |
| 1065942 | 11/1979 | Canada . |
| 1225113 | 8/1987 | Canada . |

Primary Examiner—Carl E. Hall

[57] ABSTRACT

Coils, for installation in slots in laminated cores of electromagnetic machines, particularly linear induction motors, are insulated by wrapping successively with heat resistant tape, tape of a curable silicone rubber composition which may be glass fibre reinforced, and further heat resistant tape, and curing the rubber while pressing to size those portions of the coil to be inserted in the slots. The heat resistant tapes form a mould within which the rubber is cured to form an insulating jacket. The inner layer of tape includes a lubricant layer of PTFE tape. Connections between adjacent coils may be similarly insulated when the coils are assembled prior to installation in a core.

13 Claims, 3 Drawing Sheets

METHOD OF MANUFACTURING WINDINGS FOR ELECTROMAGNETIC MACHINES

BACKGROUND OF THE INVENTION

1. Field of the Invention

This invention relates to windings for electric motors and other electromagnetic machines, of the kind which are located in slots in an armature or other laminated core. This invention is particularly but not exclusively applicable to such windings used in the slots of laminated cores of linear induction motors.

2. Review of the Art

The conditions under which such windings have to operate in a linear induction motor, especially one utilized for traction purposes, are particularly rigorous. The laminated core in which the slots are found is planar rather than cylindrical, and thus tends to be significantly less rigid than conventional cylindrical armatures. The core and its associated coils must operate in a severe environment between a vehicle to be propelled and the induction plate with respect to which the armature reacts, and are thus directly exposed to dirt, moisture and widely varying temperatures. Core assemblies constructed using conventional techniques have often proved to have an unacceptably short life under such conditions, leading to frequent failures and high maintenance costs.

Conventionally, the prepared and insulated windings are potted into the slots utilizing an epoxy resin compound, but it is found that under the stresses to which they are subjected in the cores of linear induction traction motors, such compounds are prone to microcracking followed by insulation failure as moisture penetrates to the windings. Other failure modes involve moisture penetration at other points of the windings, particularly at the external connections to the windings where the insulation is both highly stressed and vulnerable to moisture penetration at the interface with the connection assembly.

Various proposals have been made for providing improved protection of windings in slots in the cores of electrical machines.

Canadian Patent No. 638,999 (Brush) discloses a technique for producing water-tight windings in the slots of electrical machines in which the slots are lined by a sheet of silicone rubber sandwiched between two insulating sheets serving to protect the rubber, laying the winding within the lining, introducing a silicone paste into the slot, folding the lining over the winding, plugging the entrance to the slot, and curing the silicone rubber. This technique has the disadvantage that the coils must be formed and the rubber cured in situ, and that the coils can only be tested as part of the completed assembly.

Canadian Patent No. 752,551 (Dow Corning) discloses a technique for insulating high voltage windings using lapped silicon rubber tapes wound over an inner layer of silicone paste.

Canadian Patent No. 810,373 (General Motors) discloses an armature sealing technique in which resin coated conductors forming the windings are seated in resin coated slots in an armature, and portions of the windings outside of the slots are then wrapped in successive layers of silicone rubber, polytetrafluoroethylene sheeting, and glass-backed silicone rubber banding.

Canadian Patent No. 1,065,942 (General Electric Company) discusses problems encountered arising from the deterioration of epoxy resin impregnated windings, and seeks to overcome these problems by introducing silicone rubber bonded mats between the windings and the slots.

Canadian Patent No. 1,225,113 (General Electric Company) discloses slot armor for lining armature slots, in the form of a rigid glass fibre reinforced laminate with external layers of polyimide resin covered in turn by a fluorocarbon lubricating layer to reduce chafing.

SUMMARY OF THE INVENTION

The present invention seeks to provide a technique for producing water tight windings in the slots of an electrical machine which provides a durable assembly, in which the windings can be thoroughly tested before assembly into the core, and in which individual windings can be repaired without complete rebuilding of the core assembly.

According to the invention, there is provided a method of manufacturing a coil for installation in armature slots of an electromagnetic machine, wherein the coil is wound and formed, the formed coil is wrapped with a first layer of electrically insulating tape, then with a second layer of electrically insulating tape formed of a heat curable rubber composition, and then with a third layer of tape, the first and third layers of tape being formed of a material which maintains its structural integrity at the curing temperature of the rubber composition, those portions of the coil to be located in the armature slots are pressed to appropriate cross-sectional dimensions, and is heat cured to form a rubber jacket around the coil whilst the coil portions are so pressed, the first and third layers of tape forming a mould for the rubber composition during the curing process.

The invention also extends to coils, and to core assemblies for linear induction motors made by the above method.

Further features of the invention will become apparent from the following description of an exemplary preferred embodiment thereof with reference to the accompanying drawings.

SHORT DESCRIPTION OF THE DRAWINGS

DESCRIPTION OF THE PREFERRED EMBODIMENT

Figure 1:
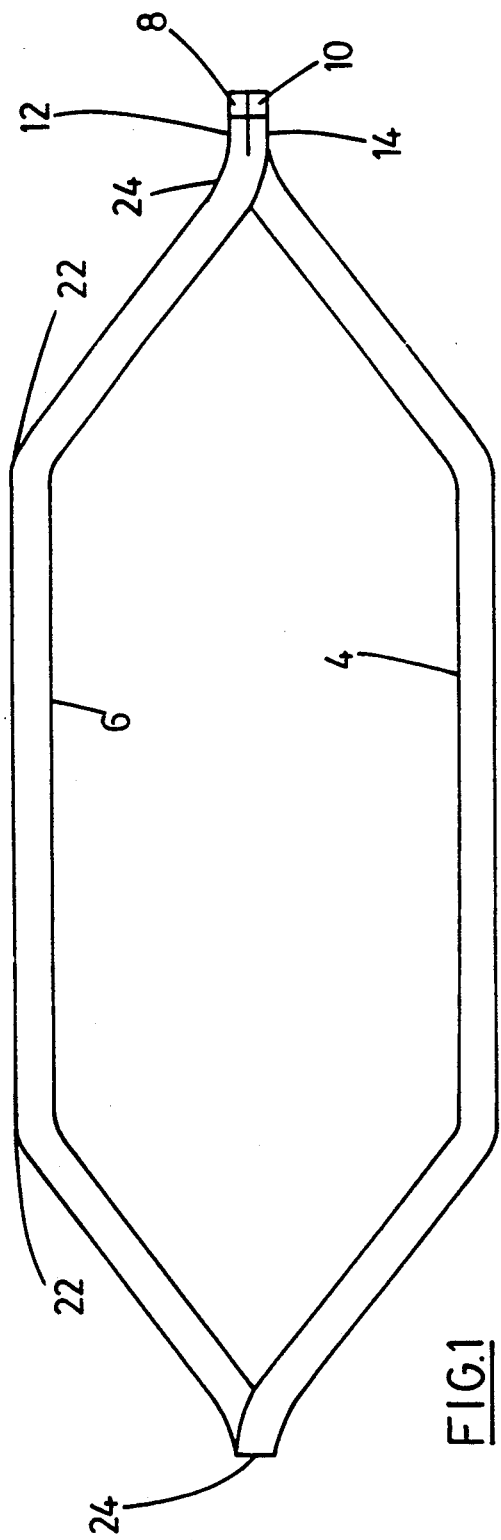
FIGS. 1 and 2 are plan and side elevational views of a single coil assembly for use in the core of a linear induction motor.
Figure 2:
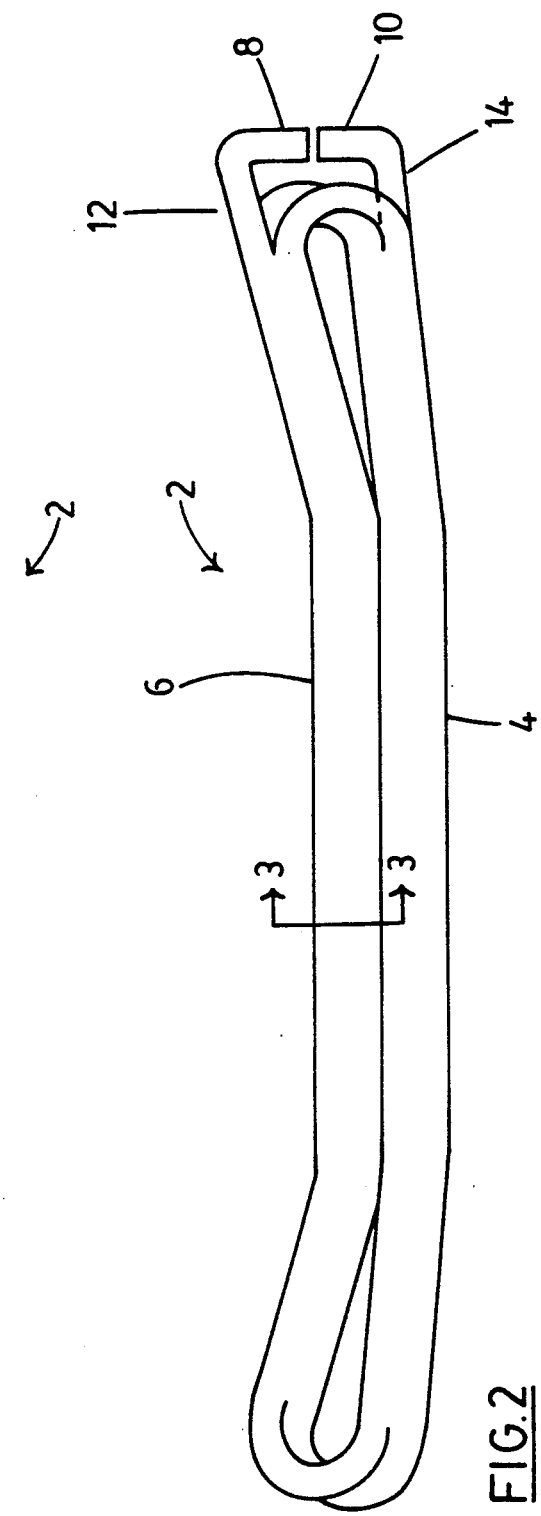
Figure 3:
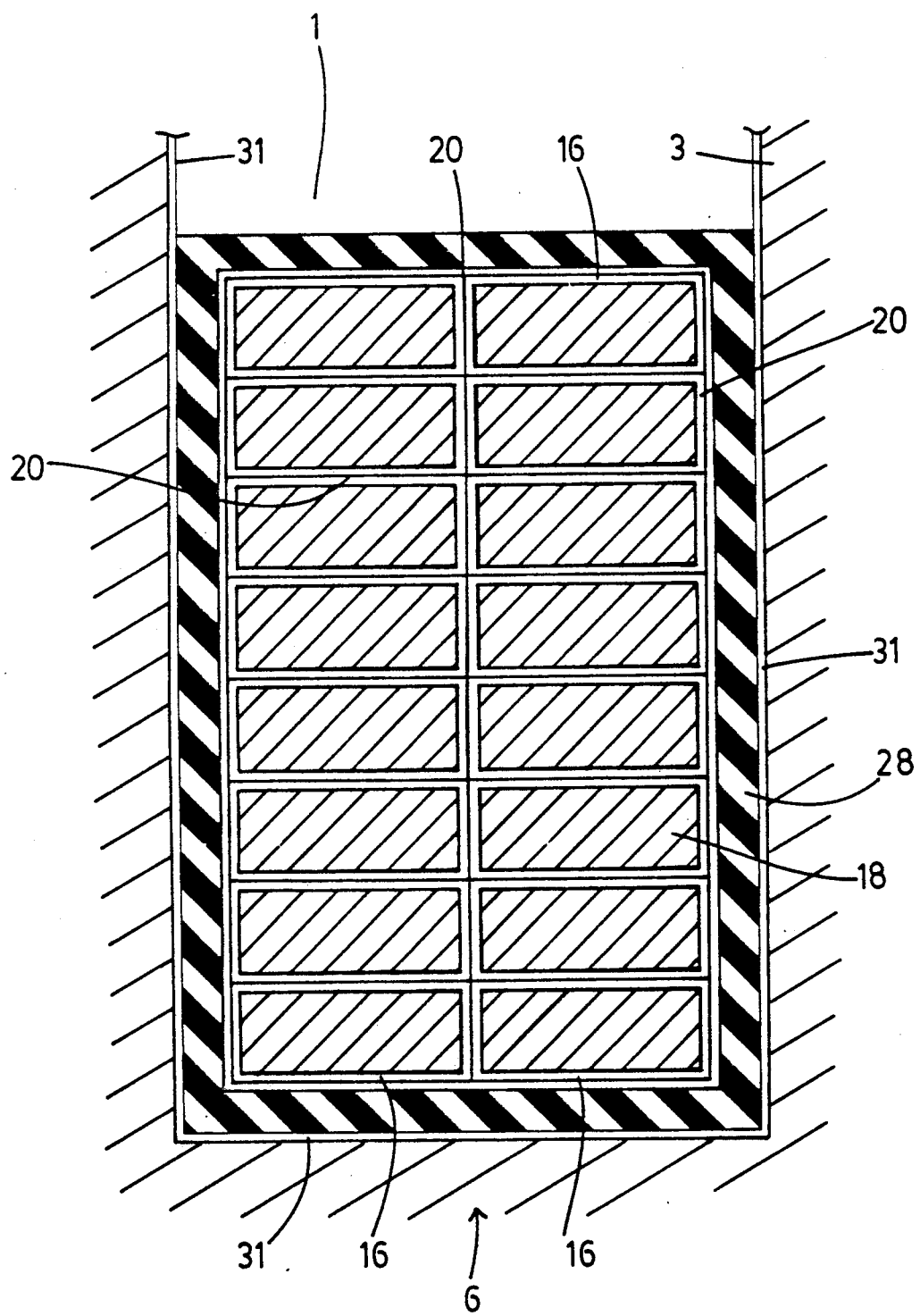
FIG. 3 is a cross-section, on an enlarged scale, on the line 3—3 in FIG. 2, of one side of the coil, showing it seated in a slot of the core.
Figure 4:
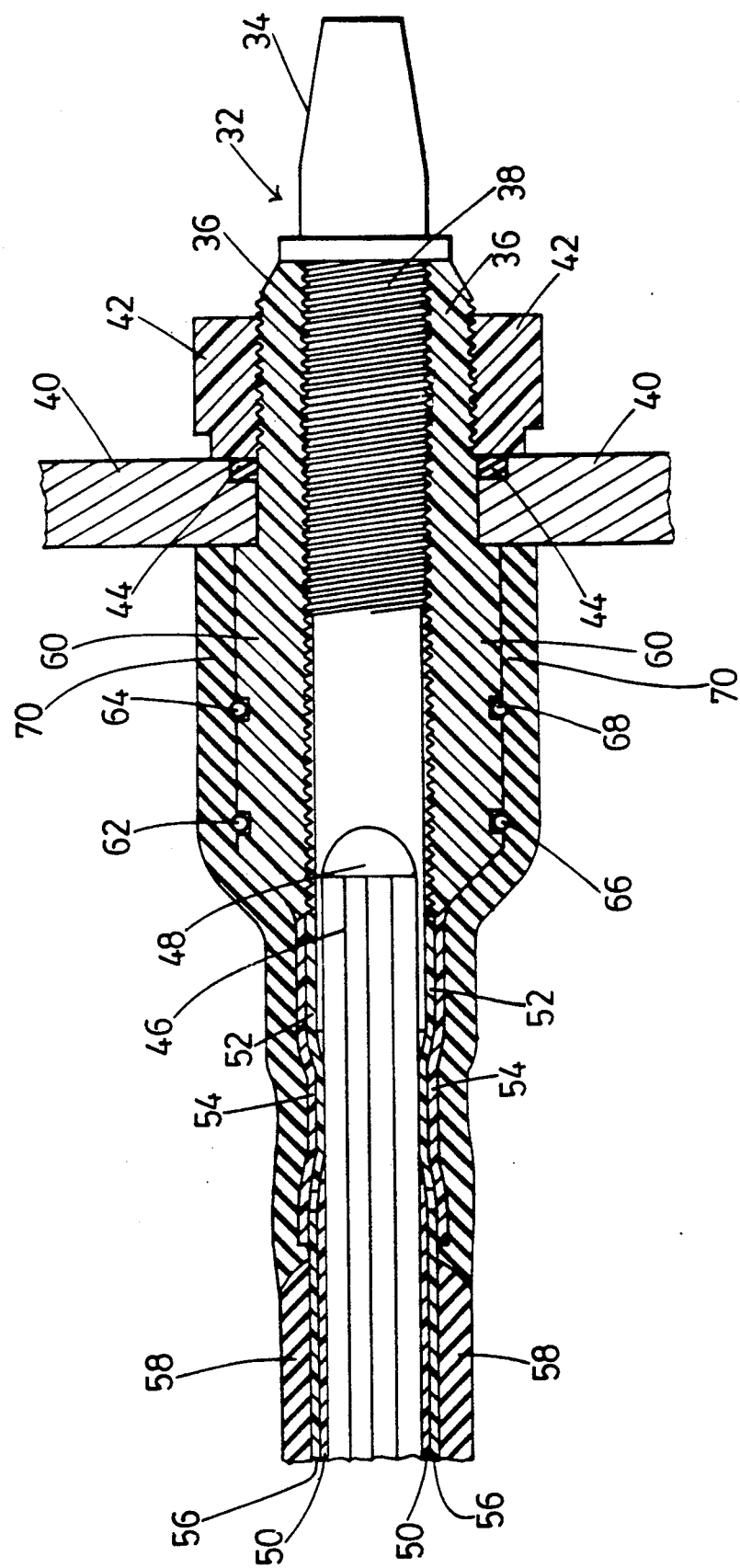
FIG. 4 is a longitudinal cross-section through a connector post providing one external connection to a group of coils together forming the core winding.

Referring to the drawings, the coil assembly 2 shown in FIGS. 1 and 2 is suitable for incorporation in the core assembly of a linear induction motor such as employed in the Light Rapid Transit (LRT) vehicles produced by the Urban Transit Development Corporation. A number of such coils are installed in overlapping relationship in parallel slots 1 (see FIG. 3) in the lower surface of a planar laminated core structure 3 (see FIG. 3) supported by the vehicle in close proximity to a horizontal reaction element extending between the rails on which the vehicle is supported. In such a location the assembly is subjected to extremely adverse environmental conditions, whilst the planar construction of the core results in its having less rigidity than a conventional cylindrical armature. The elongated central portions 4 and 6 of the coils are located in the core slots, with the portion 4 of each coil above the portion 6 of another coil in each slot except at the ends of the assembly. Connections are made to the coil through terminals 8 and 10 in one of the coil end leads 12 and 14. Each coil consists of four turns of a composite conductor 16 formed of four rectangular section copper wires 18 insulated by a fused polyimide film 20. The coils are connected to each other and to external connector posts 32 (see FIG. 4) so as to form a (typically) three phase winding, according to a known arrangement.

The assembly as thus far described is conventional; normally the coils would be taped and impregnated with epoxy resin, and the portions 4 and 6 located in the core slots 1 prior to vacuum impregnation in resin of the entire assembly. We proceed differently as will be apparent from the following description of our coil manufacturing process.

The lengths of wire 18 forming an individual coil are looped to form the basic coil, their free ends being buffed to remove insulation from terminals 8 and 10 for subsequent connection. The wires are then stacked and pressed together, and taped into a coil using a temporary sacrifice tape The coil is then shaped, and the end leads are bent and trimmed to shape to form the terminals, at which point the primary polyimide insulation of the coil is surge tested at for example 1000 volts. In the event of failure, local applications of adhesive tape, made of polyimide such as that sold under the trademark KAPTON, are made at the corners 22 and knuckles 24 of the coil where the original insulation has been most highly stressed. The test is then repeated. Once the test is passed, the sacrifice tape is removed, and the leads are reinsulated with self adhesive polyimide tape. The adhesive polyimide tape has a thickness of about 0.0023 inches. The basic insulation of the wires forming the coils is the fused polyimide film, and during the process to be described, it should be understood that self-adhesive polyimide tape is utilized to restore continuity of this film wherever it may have been prejudiced by the manufacturing process.

The coil is then wrapped throughout with TEFLON (trademark) polytetrafluorethylene (PTFE) adhesive tape, such as that sold under the trademark TEMP-R-TAPE. The tape used on the coil portions 4 and 6 is a glass fibre reinforced PTFE sheet, and is wrapped to produce two layers, whilst the remaining portions are wrapped with unreinforced tape with a 50% overlap between adjacent turns; silicone rubber compound is applied to seal any gaps in the wrapping adjacent the knuckles. Again it should be understood during the description that follows that it is an objective to ensure that the windings formed by the coil are covered, outside of a polyimide insulating layer, by a continuous PTFE insulating layer.

Following application of this PTFE layer 26, strips of uncured glass fibre reinforced silicone rubber tape, such as that sold under the trademark ARLON, are applied to all sides of the portions 4 and 6 of the coils to form two layers, and on the back and front ends of the coil, whereafter the entire coil is wrapped again with similar uncured glass fibre reinforced silicon rubber tape using a 50% overlap between adjacent turns. The portions of the coil other than the portions 4 and 6, and other portions to which the strips are applied, are double wrapped, so that the entire coil is covered with four layers of the tape to form an uncured glass fibre reinforced silicon rubber layer 28. The entire layer 28 is then wrapped again with a layer of a thin tape of KAPTON (trademark) polyimide, 0.001 inch thick, again with a 50% overlap between the turns. The result of these operations is that the coil is provided with a cladding consisting of an enclosed layer of glass fibre reinforced silicone rubber sandwiched between an inner lubricant layer of PTFE and an outer constraining layer of polyimide. Assuming for example the use of tape made of TEFLON PTFE which is a nominal 0.003 or 0.0023 inches thick, according to whether it is reinforced, KAPTON polyimide tape in the outside wrapping which is a nominal 0.001 inches thick, and reinforced silicone rubber tape which is a nominal 0.011 inches thick, this will provide an innermost insulation layer of at least 0.003 inches of polyimide, a layer of about 0.005 inches of PTFE, 0.044 inches of reinforced rubber, and a temporary outer wrapping of 0.002 inches of polyimide. The layer thicknesses should produce dimensions of the coil portions 4 and 6 which are slightly in excess of the available width and depth of the slots in the core.

The wrapped coil portions 4 and 6 are then clamped in a jig which presses them to the exact dimensions required to fit the slots snugly, and whilst in the jig the rubber insulation is then vulcanised, typically by passing sufficient electric current through the coil to heat the rubber to vulcanisation temperature. The coil is then unclamped, and the outer polyimide tape removed since it has served its purpose of moulding the rubber during curing. The rubber is then postcured at, for example, 200° C. for ten hours, after which the coil is dipped in a silicone varnish and further heat cured at 200° C. to form a layer 30.

At this point the coil can be submerged in water and subjected to a high voltage insulation test before being further assembled. Assuming that it passes this test, it is assembled with a group of adjacent coils using suitable bracing, and the ends of the leads are cleaned and the individual conductors interleaved and bonded to provide the required connections between the coils. Adjacent insulation is roughened to improve bonding, and the connection zone is wrapped successively with self-adhesive polyimide tape to cover areas where the basic polyimide insulation of the copper has been removed or weakened, self-adhesive PTFE tape, reinforced silicone rubber tape to form an uncured rubber layer, and polyimide tape in a manner generally similar to that already described, before again vulcanising the coils as a group, removing the outer polyimide tape, and again testing the combined insulation of the group of coils. The group of coils may then be installed in the slots of the core, which are lined with glass fibre cloth 31, and connected to each other and reinsulated using a technique similar to that just described above, and to the posts 32 using the technique to be further described with reference to FIG. 4. The objective is to ensure that the entire winding is covered by three superposed continuous layers of insulation, namely an innermost layer of polyimide, a low friction layer of PTFE, and a continuous outer layer of cured, moulded and reinforced silicone rubber. The entire winding is then further cured using induction heating, postcured, varnished with silicone varnish, vacuum pressure impregnated with resin, cured again, and subjected to a final under-water insulation test. The resin utilized for impregnation is preferably selected to have a degree of flexibility when cured so as better to withstand straining of the somewhat flexible core assembly in use.

However great the integrity of the insulation applied to the windings, failures will still occur if this integrity cannot be maintained in the vicinity of the terminal posts where the windings are connected to their electrical supply, and in practice many failures in prior constructions have occurred in this area, where the conductors are subjected to stress, and moisture may be able to penetrate longitudinally beneath the insulation. We have therefore invented a technique to ensure moisture proof termination of the insulation of the windings at the terminal posts 32, as described below with reference to FIG. 4.

Each terminal post 32, formed of brass, is formed at one end with a tapered spigot 34 configured to mate with a complementary socket (not shown) at the end of an insulated supply cable, which socket is constructed so as to be clamped in contact with the post 32, and so as to enter watertight sealing relationship with a bushing 36 into which is screwed a threaded shank 38 of the post 32. The bushing 36 is moulded from polytetrafluorethylene and is secured in an aperture in a part of a frame 40 supporting the core by means of a PTFE nut 42 and a neoprene sealing washer 44 received in a recess in the frame.

Terminal ends 46 of the copper conductors forming the connection to the winding are bonded by soldering into a recess 48 formed in the end of the shank 38. The conductors are then wrapped with polyimide self-adhesive tape to cover those portions from which the polyimide insulation 50 has been removed so as to permit the bonding operation, this wrapping 52 being continued over the end portion of the shank 38 projecting from the bushing 36. This wrapping is followed by a wrapping 54 with self-adhesive PTFE tape extending from an end of the PTFE wrapping 56 which covers the insulation 50 to the bushing 36. A wrapping of uncured glass fibre reinforced silicone rubber, four plies thick, is then applied extending from an end, roughened for bonding purposes, of an existing rubber jacket 58 formed as already described above, to the end of an enlarged diameter portion 60 of the bushing 36 which when installed abuts the frame 40. Before applying this cladding, O-rings 62 and 64 or other sealing elements of cured silicone rubber are located in peripheral groves 66 and 68 in the portion 60 of the bushing.

The applied rubber tape is wrapped with polyimide tape and then cured as previously described, after which the tape is removed. As the rubber of the tape vulcanizes during the curing step, it bonds to the O-rings 62 and 64 and in conjunction with them sets up a moisture tight seal between the bushing and the rubber layer 70 formed by the cured rubber of the tape. The rubber layer 70 is likewise bonded to the jacket 58. These bonds provide an effective barrier to the ingress of moisture.

The process just described produces an integral sealed jacket of reinforced silicone rubber around the windings, the jacket being vulcanised within a mould formed between the inner wrappings of polyimide and PTFE tape, and the outer wrapping of polyimide tape. The primary purpose of the latter is to constrain the rubber layer during curing, and it is removed upon completion of the initial curing step, and replaced by a coating of silicone varnish. The reinforced rubber jacket has proved much more resistant to premature insulation failure than the conventionally utilized epoxy resin. While durability tests are not yet complete, a mean time before failure many times that of the conventional construction is indicated.

In the event of a fault developing in the insulation of a coil in a core assembly manufactured according to the invention, repair will often be practicable without complete rebuilding of the core by removal and replacement of a defective coil, the connections of the replacement coil to adjacent coils being reinsulated as described above.

While the process described can be used for the preparation of coils for electromagnetic machines other than linear induction motors, it is believed that it is likely to be necessary and economic only in applications where conventional insulation techniques are inadequate to stand up to the conditions under which the coils are operated. The use of a layer of PTFE tape beneath the rubber layer is preferred because of its lubricating properties, whilst both the inner and outer tape layers must be of material sufficiently heat resistant to withstand the temperature required to vulcanise the intermediate rubber layer without losing their structural integrity. Various KAPTON polyimide and TEFLON polytetrafluorethylene based silicone adhesive tapes sold by CHR Industries under the trademark TEMP-R-TAPE can meet these requirements. A suitable grade of glass fibre reinforced silicone rubber tape is ARLON (trademark) grade 44450R011.

We claim:

1. A method of manufacturing a coil for installation in laminated core slots of an electromagnetic machine, including the steps of winding the coil, forming the coil, wrapping the formed coil with a first layer of electrically insulating tape, then with a second layer of electrically insulating tape formed of a heat curable rubber composition, and then with a third layer of tape, the first and third layers of tape being formed of a material which maintains its structural integrity at the curing temperature of the rubber composition, pressing those portions of the coil to be located in the core slots to the cross-sectional dimensions of said slots, and curing the rubber composition to form a rubber jacket around the coil whilst the coil portions are so pressed, with the first and third layers of tape forming a mould for the rubber composition during the curing process.

2. A method according to claim 1, wherein the second layer is of glass fibre reinforced silicone rubber.

3. A method according to claim 1, wherein the first layer comprises a lubricant layer of polytetrafluorethylene tape.

4. A method according to claim 3, wherein the first layer is locally reinforced by layers of polyimide tape.

5. A method according to claim 3, wherein the first layer is locally reinforced with glass fibres.

6. A method according to claim 1, wherein the third layer is of polyimide tape.

7. A method according to claim 6, wherein the third layer is removed before installation of the coil in slots of a core.

8. A method according to claim 1, including the step of testing insulation of the coil prior to installation into slots of a core.

9. A method according to claim 1, including the further step of connecting together a plurality of the coils into an assembly, wrapping the connections between the coils with first, second and third layers of tape the same as the first, second and third layers used to wrap each coil, and repeating the heat curing process, to insulate the connections prior to installing the assembly in the slots of a core, and to ensure continuity of the first layer of tape and of the rubber jacket throughout the assembly.

10. A method according to claim 9, including the step of testing insulation of the coil assembly prior to installation in slots of a core.

11. A method according to claim 9, including the step of bonding terminals of the assembly to terminal posts passing through insulative bushings, locating peripheral rubber seals in peripheral grooves surrounding the bushings, wrapping the connections between the terminals and the terminal posts with first, second and third layers of tape similar to those used to wrap each coil, the second and third layers being extended over the seals in the bushings, and repeating the heat curing process so as to ensure the continuity of the rubber jacket formed by the second layer, and its bonding to the rubber of the seals.

12. A method as claimed in claim 11, wherein the seals are silicone rubber O-rings.

13. A method as claimed in claim 11, wherein the bushing is of polytetrafluorethylene.

* * * * *